UNITED STATES PATENT OFFICE.

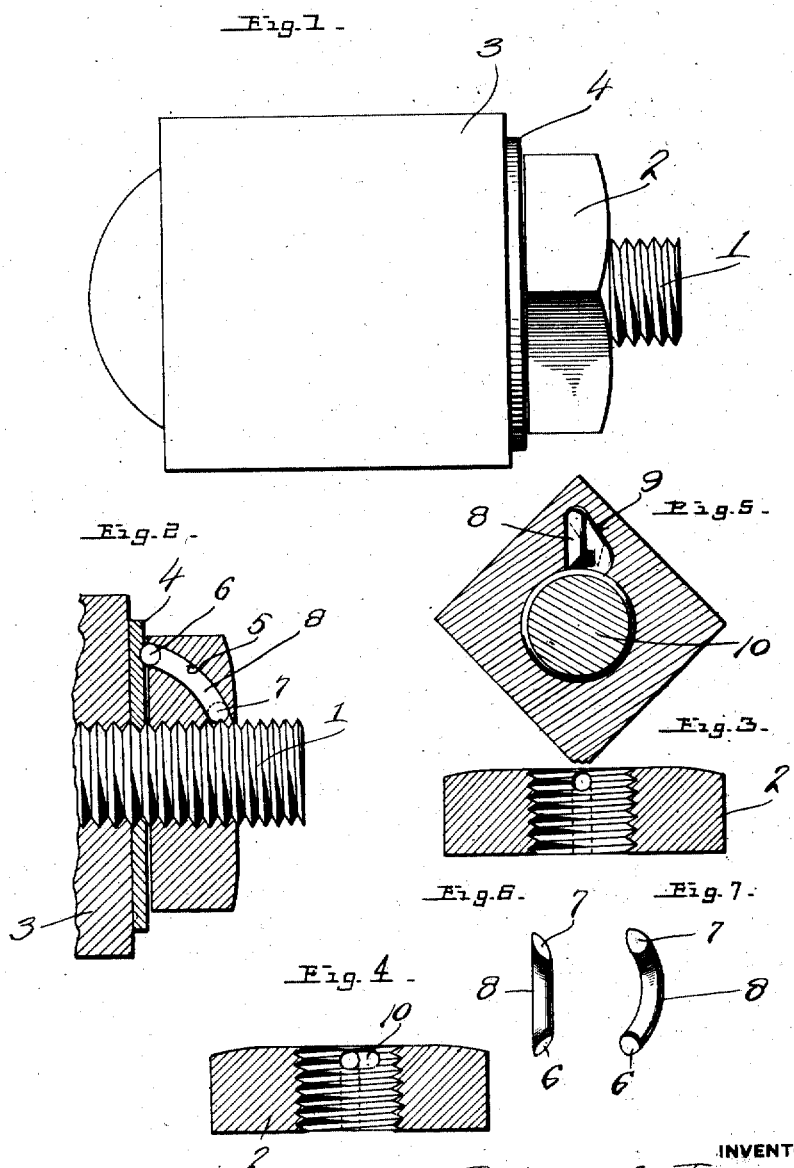

LEWIS A. JAMES, OF ELK CITY, KANSAS.

NUT-LOCK.

1,218,184.  Specification of Letters Patent.  Patented Mar. 6, 1917.

Application filed November 3, 1916. Serial No. 129,373.

*To all whom it may concern:*

Be it known that I, LEWIS A. JAMES, a citizen of the United States, residing at Elk City, in the county of Montgomery and State of Kansas, have invented certain new and useful Improvements in Nut-Locks, of which the following is a specification.

This invention has relation to nut locks, and has for an object to provide a nut lock in which the securing means is contained entirely within the nut and whereby the nut may be applied, and associated with a bolt and washer of conventional type, without altering the nature of the washer in any manner whatsoever.

Another object of the invention is to provide a nut lock having the above named characteristics and means whereby the rotation of the nut relative to the bolt in the act of clamping the nut upon the work may be accomplished with facility, said means however, precluding counter rotation of the nut relative to the bolt, thereby constituting the nut lock.

A still further object of the invention is to provide a nut lock which will be extremely simple in construction, comprising but few parts, and hence permitting the manufacture of the same in an economical manner.

In addition to the foregoing my invention comprehends improvements in the details of construction, and arrangement of parts to be hereinafter more fully described and particularly pointed out in the appended claims.

In the accompanying drawings in which similar and corresponding parts are designated by the same characters of reference throughout the several views in which they appear:

Figure 1, is a view in side elevation of my improved nut lock illustrating its position upon a bolt.

Fig. 2, is a longitudinal section through the nut and associated parts.

Fig. 3, is a sectional view of the nut *per se.*

Fig. 4, is a view similar to the above of a slightly modified form of nut.

Fig. 5, is a horizontal sectional view taken through the nut shown in the preceding figure, and Figs. 6 and 7, are detail views in elevation of the locking member constituting a part of my invention.

With reference to the drawings 1 indicates a threaded bolt, and 2, a nut having threaded engagement therewith, the two constituting the conventional form of nut and bolt. The work indicated conventionally at 3 is to be secured by the bolt, and an apertured washer 4 is passed over the bolt and interposed between the nut and the work as indicated in Fig. 1.

To modify the nut for the purpose of my invention, I provide a passage 5 therein, which passage extends from a point upon the threaded portion of the nut adjacent its outer face, to a point upon the opposite face of the nut, and adjacent its outer edge. The opening is preferably disposed from one corner of the nut to the central aperture thereof adjacent opposite face as indicated in the several views of the drawings as this enables a longer passage to be provided, although if desired the passage may be extended from a point between adjacent corners. As before stated, the passage opens at one end upon one face of the nut adjacent its extreme outer edge, while the opposite end of the passage opens into the central threaded aperture of the nut adjacent the opposite face, this arrangement being clearly indicated in Fig. 2. The passage 5 is also preferably curved, with the concaved portion thereof directed toward the center of the nut, although if desired the passage may be made straight.

The locking element of the present invention is illustrated in detail in Figs. 6 and 7, reference to which discloses the same to consist of an arcuate member, circular in cross section and having its extremities beveled in opposite directions as indicated at 6 and 7. One terminal may be beveled to a degree greater or less than the opposite end, to increase its locking efficiency. The locking element, which may be designated generally at 8, is curved to correspond to the curvature of the passage 5 which extends through the nut, and it is preferable that the locking element be permitted slight movement within the passage.

The terminals of the locking element should be sharpened, and the whole constructed of relatively hard steel, and when the locking element is disposed within its passage, and the nut applied to a bolt, and rotated thereon, one bevel face, 7 is adapted to bear and engage upon the threads of the bolt, the other beveled terminal engaging the face of the washer 4. Thus it will be obvious, that by providing the bevel in the same direction, the terminals of the locking element may be permitted to frictionally move upon the threads of the bolt and the face of the washer, with facility. However, should the nut be turned in a counter-direction, the sharpened terminals of the locking element will immediately engage and bite into the threads of the bolt and the surface of the washer, thus precluding further rotative movement in a counter direction. In order that the locking element may properly operate, it is obviously necessary that it be slightly longer than the passage 5 in order that it may project beyond both ends thereof, and thus be in a position to engage the washer and threads of the bolt.

As set forth above, the beveled terminals of the locking element will permit rotation of the nut relative to the bolt in one direction, but precludes counterwise movement of the nut. To further facilitate movement of the nut relative to the bolt, in a counter-clockwise direction when removing the same, I modify the configuration of the passage 5 in a manner set forth in Figs. 4 and 5. To this end, the terminal of the passage adjacent the threaded aperture, is elongated so as to provide in effect, two passages which merge into a single opening upon the rear face of the nut. Thus, the locking element when disposed in the recess, may be oscillated from one passage into another. This passage is indicated at 9, and the elongated portion thereof at 10. When this form of nut is applied to a bolt, a movement of the nut in a counter direction will be under normal circumstances precluded by engagement of the locking element with the threads of the bolt. The nut is thus secured against accidental rotation caused by jars or shocks, when in use. However, to forcibly remove the nut from the bolt, the nut may be rotated in a counter clockwise direction, whereby the locking element will be rotated sufficiently to permit it to enter the second recess 9 as indicated in dotted lines in Fig. 5, thereby becoming disengaged from the threads of the bolt and permitting the nut to be easily removed.

While I have illustrated and described my invention with some degree of particularity, I realize that in practice various alterations thereof may be made and I therefore reserve the right and privilege of changing the form of the details of construction, or otherwise altering the arrangement of the correlated parts without departing from the spirit of the invention, or the scope of the appended claims.

Having thus described my invention what I claim as new and desire to secure by Letters Patent is:—

1. A nut lock comprising in combination a bolt, a nut and washer applied thereto, said nut having an aperture extending therethrough, and a locking pin having its ends beveled, and adapted to engage the threads of the bolt and the washer, to preclude relative movement of the nut and bolt, said beveled ends permitting rotation of the nut relative to the bolt when rotating the nut to clamp the same upon the work.

2. A nut lock comprising in combination a bolt, a nut and washer applied thereto, said nut having an arcuate passage extending therethrough, and an arcuate locking pin having its terminal sharpened, disposed in the opening and adapted to engage at its opposite end, the threads of the bolt, and the surface of the washer to preclude rotation of the nut relative to the bolt.

3. A nut lock comprising in combination a bolt, a nut and washer applied thereto, said nut having an arcuate passage therethrough, and extending from a point upon the threaded surface of the nut, to a point upon the rear face of the nut adjacent its outer edge, and a locking pin disposed in the recess and adapted to engage at its terminal the face of the washer, and the threads of the bolt to preclude rotation of the nut relative to the bolt.

4. A nut lock comprising in combination a bolt, a nut and washer applied thereto, said nut having an arcuate passage extending from a point upon the threaded surface thereof adjacent the front face, to a point upon the rear face of the nut adjacent its outer edge, and a locking pin disposed within the passage and having its opposite ends beveled, whereby to engage the threads of the bolt, and the surface of the washer to preclude rotation in one direction of the nut relative to the bolt, said beveled ends permitting rotation of the nut in an opposite direction.

5. A nut lock comprising in combination a bolt, a nut and washer applied thereto, the nut having a passage extending therethrough with one terminal of the passage widened, a locking element disposed in the passage and adapted to engage at opposite ends the face of the washer, and the threads of the bolt to preclude accidental rotation of the nut relative to the bolt in one direction, the elongated portion of the passage permitting movement of the locking element thereinto when the nut is forcibly rotated to remove the same from the bolt.

In testimony whereof I affix my signature in presence of two witnesses.

LEWIS A. JAMES.

Witnesses:
N. N. BEEMAN,
C. A. BEEMAN.